(12) United States Patent
Okabe et al.

(10) Patent No.: US 11,091,125 B2
(45) Date of Patent: Aug. 17, 2021

(54) WIPER APPARATUS AND VEHICLE BODY REAR STRUCTURE

(71) Applicant: HONDA MOTOR CO., LTD., Tokyo (JP)

(72) Inventors: Koji Okabe, Wako (JP); Masashi Miyazawa, Wako (JP); Masaki Kawamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 301 days.

(21) Appl. No.: 16/256,597

(22) Filed: Jan. 24, 2019

(65) Prior Publication Data

US 2019/0152444 A1 May 23, 2019

Related U.S. Application Data

(63) Continuation of application No. PCT/JP2017/024287, filed on Jul. 3, 2017.

(30) Foreign Application Priority Data

Sep. 21, 2016 (JP) .............................. JP2016-184657

(51) Int. Cl.
- *B60S 1/38* (2006.01)
- *B60S 1/58* (2006.01)
- *B62D 35/00* (2006.01)

(52) U.S. Cl.
CPC ............. *B60S 1/381* (2013.01); *B60S 1/3881* (2013.01); *B60S 1/583* (2013.01); *B62D 35/007* (2013.01)

(58) Field of Classification Search
CPC ........ B60S 1/381; B60S 1/3881; B60S 1/583; B62D 35/007
See application file for complete search history.

(56) References Cited

U.S. PATENT DOCUMENTS

| | | | |
|---|---|---|---|
| 6,499,179 B1 * | 12/2002 | Fink ....................... | B60S 1/0408 15/250.04 |
| 2007/0174989 A1 | 8/2007 | Moll et al. | |
| 2007/0200389 A1 * | 8/2007 | Ina .......................... | B60J 5/101 296/180.1 |

FOREIGN PATENT DOCUMENTS

| | | |
|---|---|---|
| CN | 103204186 A | 7/2013 |
| JP | S61-075044 A | 4/1986 |
| JP | H04-003860 U | 1/1992 |
| JP | H09-002339 A | 1/1997 |

(Continued)

OTHER PUBLICATIONS

International Search Report for PCT/JP2017/024287 dated Aug. 8, 2017 (partially translated).

(Continued)

*Primary Examiner* — Andrew A Horton
(74) *Attorney, Agent, or Firm* — Thomas | Horstemeyer, LLP

(57) ABSTRACT

A wiper apparatus 4 is configured to wipe a rear windshield of a vehicle body rear portion. Above the vehicle body rear portion, the wiper apparatus is arranged on a rear side and a lower side of an ornamental member arranged to form a space to flow air between the ornamental member and an upper surface portion of the vehicle body rear portion. The wiper apparatus is provided with a flow straightening portion standing on the wiper apparatus and including a surface portion that inclines to a vehicle body rear side from a base portion toward a top portion.

4 Claims, 6 Drawing Sheets

(56) References Cited

FOREIGN PATENT DOCUMENTS

| JP | 2008-546596 A | 12/2008 |
| JP | 2009-286160 A | 12/2009 |
| JP | 2012-136149 A | 7/2012 |

OTHER PUBLICATIONS

Japanese Office Action (w/ partial translation) issued for Japanese Patent Application No. 2018-540647 dated Aug. 9, 2019.

\* cited by examiner

FIG. 2A
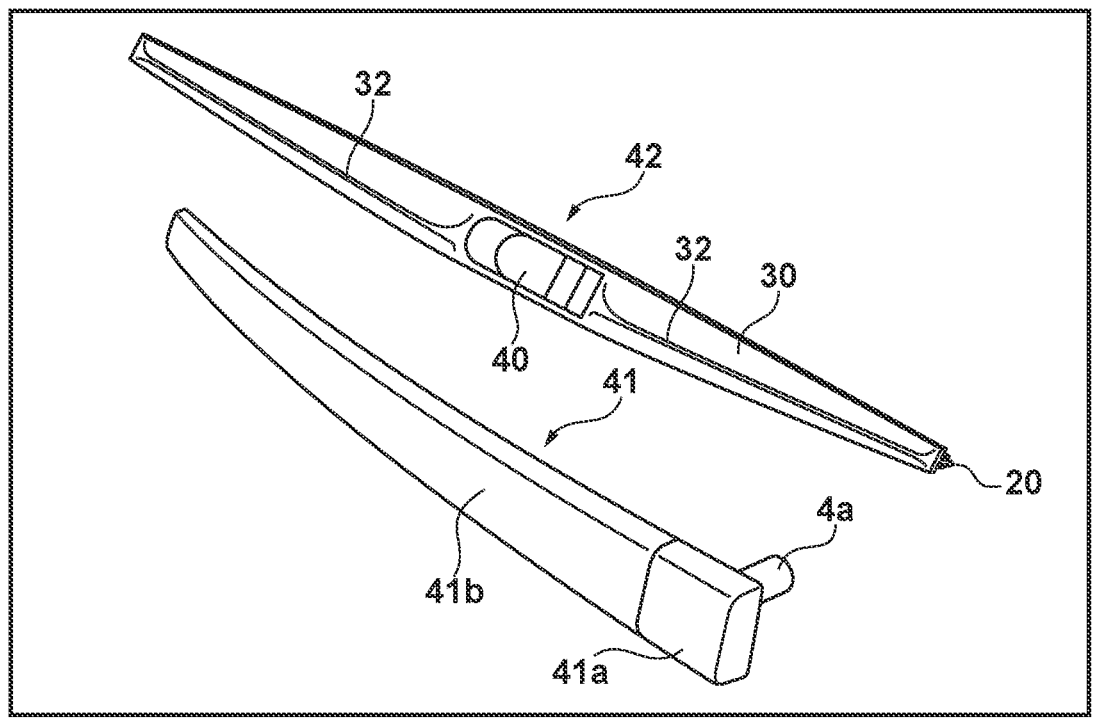
FIG. 2B
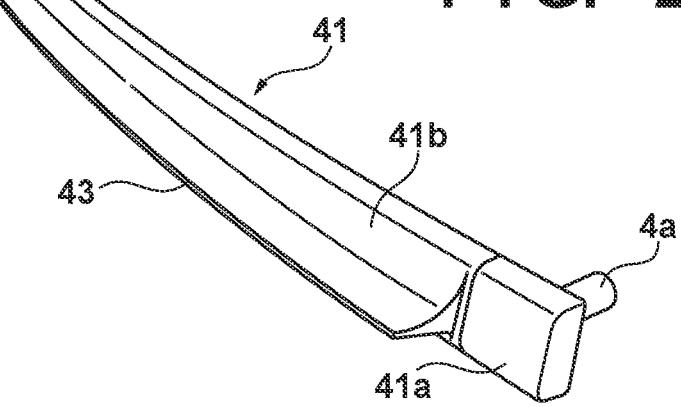
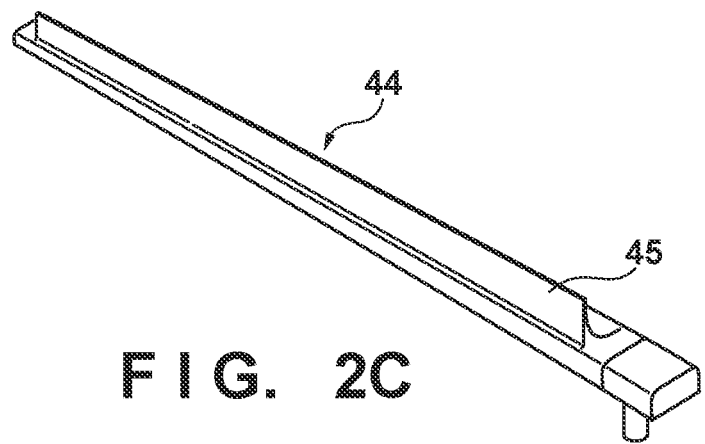
FIG. 2C

WIPER APPARATUS AND VEHICLE BODY REAR STRUCTURE

CROSS-REFERENCE TO RELATED APPLICATION(S)

This application is a continuation of International Patent Application No. PCT/JP2017/024287 filed on Jul. 3, 2017, which claims priority to and the benefit of Japanese Patent Application No. 2016-184657 filed on Sep. 21, 2016, the entire disclosures of which are incorporated herein by reference.

TECHNICAL FIELD

The present invention relates to a wiper apparatus and a vehicle body rear structure.

BACKGROUND ART

Japanese Patent Laid-Open No. 2009-286160 discloses a rear spoiler structure arranged above a tailgate with a space between it and the tailgate. Japanese Patent Laid-Open No. 61-750442 discloses providing a rear wiper used to wipe the glass of a back door.

In a case in which a rear spoiler is arranged with a space between it and a tailgate, as in Japanese Patent Laid-Open No. 2009-286160, a traveling wind A1 flowing under a rear spoiler 6' and a traveling wind A2 flowing above the rear spoiler 6' may merge and generate reversely rotating large vortices W on the rear side. When a rear wiper apparatus 4' is arranged on the rear side of the rear spoiler 6', a lock back state (see FIG. 1) in which the rear wiper apparatus 4' floats of itself from a rear windshield 3 due to the vortices W generated by the rear spoiler 6' and locks may occur.

SUMMARY OF INVENTION

The present invention has been made in consideration of the above-described problem, and implements a wiper apparatus and a vehicle body rear structure, which prevent a rear wiper from floating due to vortices generated on the rear side of a rear spoiler.

In order to solve the above-described problem and achieve the object, according to the present invention, there is provided a wiper apparatus configured to wipe a rear windshield of a vehicle body rear portion, wherein above the vehicle body rear portion, the wiper apparatus is arranged on a rear side and a lower side of an ornamental member arranged to form a space to flow air between the ornamental member and an upper surface portion of the vehicle body rear portion, and the wiper apparatus is provided with a flow straightening portion standing on the wiper apparatus and including a surface portion that inclines to a vehicle body rear side from a base portion toward a top portion.

Additionally, according to the present invention, there is provided a vehicle body rear structure including a wiper apparatus configured to wipe a rear windshield, wherein above a vehicle body rear portion, an ornamental member is provided to form a space to flow air between the ornamental member and an upper surface portion of the vehicle body rear portion, and a projecting portion projecting to the upper surface portion is provided on a face of the ornamental member facing the upper surface portion of the vehicle body rear portion, the projecting portion being arranged at a position at which the projecting portion overlaps the wiper apparatus in a vehicle width direction when viewed from a vehicle longitudinal direction.

Advantageous Effects of Invention

According to the present invention, it is possible to prevent the rear wiper from floating due to vortices generated on the rear side of the rear spoiler and suppress lock back.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2A is an external view showing the rear wiper apparatus according to the embodiment;

FIG. 2B is an external view showing the rear wiper apparatus according to the embodiment;

FIG. 2C is an external view showing the rear wiper apparatus according to the embodiment;

DESCRIPTION OF EMBODIMENTS

The embodiment of the present invention will now be described in detail with reference to the accompanying drawings.

Figure 1:
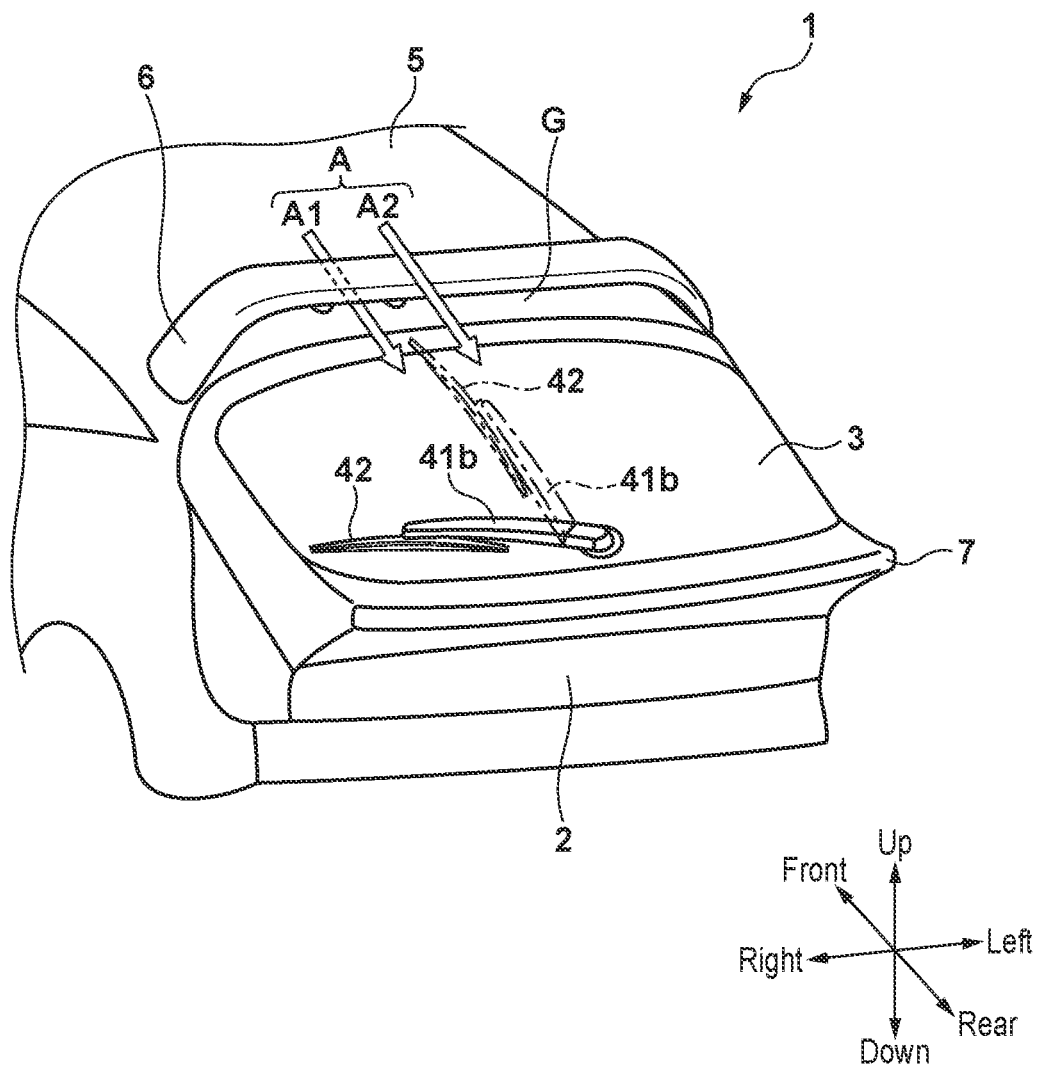
FIG. 1 is an external view showing a vehicle body rear structure including a rear wiper apparatus according to the embodiment.

As shown in FIG. 1, a vehicle body rear structure 1 according to this embodiment includes, for example, a rear wiper apparatus (to be referred to as a wiper apparatus hereinafter) 4 configured to wipe a rear windshield 3 provided in a back door 2 or the like which opens/closes a vehicle body rear portion such as a tailgate, a first rear spoiler 6 serving as an ornamental member that is provided at the rear end of a roof 5 and mainly attaches importance to the design, and a second rear spoiler 7 that is provided at the lower end of the rear windshield 3 in the back door 2 and mainly attaches importance to aerodynamic performance.

The front end (upper end) of the back door 2 is axially supported at the rear end of the roof 5 such that the vehicle body rear portion can be opened/closed. The first rear spoiler 6 extends in the vehicle width direction at the rear end of the roof 5, and is laid like a bridge in the vehicle width direction with a predetermined space G between it and the upper surface portion of the roof 5. The first rear spoiler 6 is thus configured to make a traveling wind A flow through the predetermined space G from the vehicle body front side to the vehicle body rear side.

As shown in FIG. 2A as well, the wiper apparatus 4 includes a wiper arm 41 and a wiper blade 42. The wiper blade 42 is connected to the distal end of the wiper arm, and the wiper arm 41 swings about a predetermined rotating shaft 4a to wipe out raindrops and the like adhered to the glass surface of the rear windshield 3 by the wiper blade 42. In a stop state, the wiper apparatus 4 stands still in a posture horizontal or tilted in the vehicle width direction from the predetermined rotating shaft 4a in a state in which the wiper blade 42 is in contact with the glass surface of the rear windshield 3.

The wiper arm 41 includes a first arm portion 41a provided with the rotating shaft 4a, and a second arm portion 41b connected to the first arm portion 41a. The second arm portion 41b can hold a lock back state (see FIG. 1) in which it is spaced part from the glass surface of the rear windshield 3 with respect to the first arm portion 41a. The lock back function is a function of fixing the wiper arm 41 in a state in which it is spaced apart from the glass surface of the rear windshield 3 when, for example, exchanging the wiper blade 42 (blade rubber 20). When a user displaces the second arm portion 41b to a state in which it is bent at a predetermined angle with respect to the first arm portion 41a, as shown in FIG. 1, the bent state is held by the biasing force of a tension spring or the like (not shown) provided in the arm portion.

The wiper blade 42 includes the blade rubber 20 that comes into contact with the rear windshield 3, a holder 30 that holds the blade rubber 20, and an arm connecting portion 40 provided at the intermediate portion of the holder 30 in the longitudinal direction.

Figure 3:
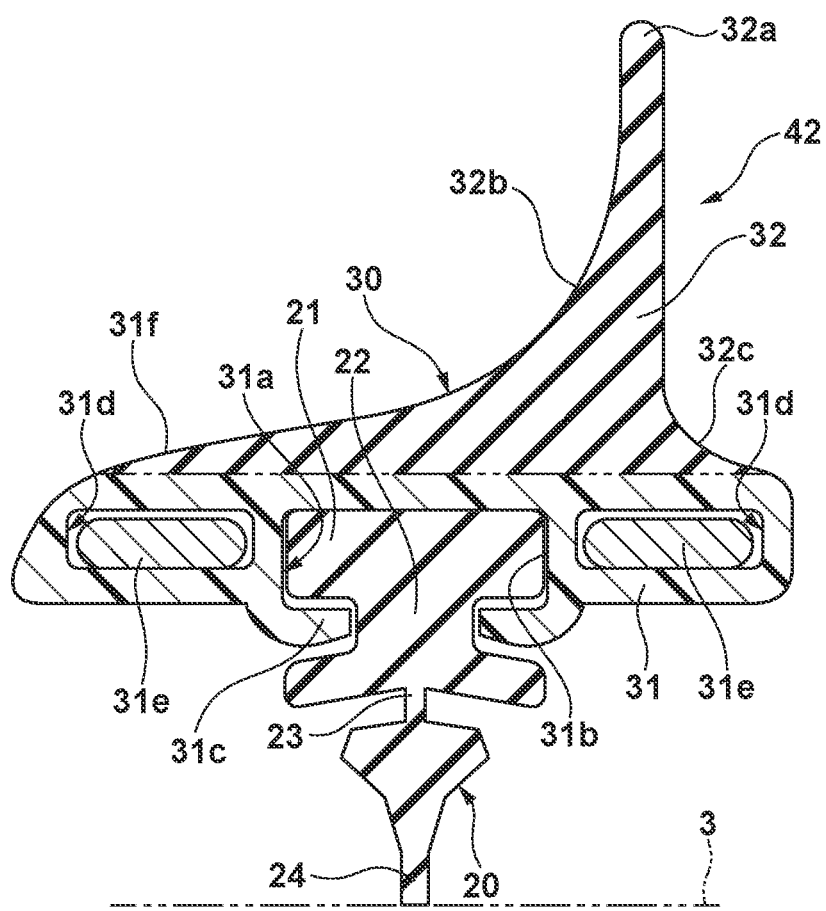
FIG. 3 is a view showing the sectional shape of a wiper blade.

As shown in FIG. 3, the blade rubber 20 includes a main body portion 21, a body portion 22, a neck portion 23, and a lip portion 24. The blade rubber 20 is formed into a long shape by extruding an elastic material such as rubber, and its sectional shape is a uniform shape over the entire lengthwise direction. The thickness of the neck portion 23 is set to be less than the thickness of the body portion 22, and the neck portion 23 is readily elastically deformed. This allows the lip portion 24 to tilt when the wiper blade 42 slidably moves on the glass surface of the rear windshield 3, and the distal end of the lip portion 24 smoothly follows the sliding direction of the wiper blade 42 to reliably wipe rainwater, dust, and the like adhered to the glass surface of the rear windshield 3.

The holder 30 includes a holder main body 31 and a flow straightening portion 32. The holder main body 31 and the flow straightening portion 32 are integrated and formed into a long shape by two-color-molding (extruding) materials whose hardnesses are different from each other. The holder main body 31 is made of a resin material such as a flexible plastic to enable following to the rear windshield 3 while ensuring a strength enough to hold the blade rubber 20. A holding portion 31a extending along the longitudinal direction of the holder main body 31 is formed at the intermediate portion of the holder main body 31 in the widthwise direction (left-right direction in FIG. 3). The holding portion 31a is formed by a holding groove 31b and a holding claw 31c configured to hold the main body portion 21 of the blade rubber 20. Accordingly, the blade rubber 20 is reliably held without dropping from the holder main body 31. In addition, a pair of accommodation portions 31d each having an almost rectangular sectional shape are provided on both sides of the holder main body 31 in the widthwise direction. A plate-shaped vertebra 31e made of steel with a spring property is stored in each accommodation portion 31d. Each vertebra 31e is provided in the corresponding accommodation portion 31d to be movable in the longitudinal direction, that is, in a non-fixed state. Accordingly, the elastic force of each vertebra 31e is efficiently transmitted to the holder main body 31 and the blade rubber 20. In a natural state without load of an external force, each vertebra 31e is curved at a curvature larger than that of the rear windshield 3. The vertebras 31e are configured to elastically deform the holder main body 31 and the blade rubber 20 according to the curvature of the rear windshield 3 such that the whole region of the lip portion 24 along the longitudinal direction comes into tight contact with the rear windshield 3.

The flow straightening portion 32 stands on an upper surface portion 31f of the holder main body 31 on the opposite side of the rear windshield 3. A top portion 32a farthest from the rear windshield 3 is formed at the distal end of the flow straightening portion 32. The top portion 32a is located on the downstream side in the flow direction of a traveling wind along the widthwise direction of the upper surface portion 31f of the holder main body 31.

A first plane portion 32b smoothly inclining along the flow direction of the traveling wind is provided on one side (vehicle body front side) of the flow straightening portion 32 in the widthwise direction. The cross section of the first plane portion 32b along the widthwise direction of the flow straightening portion 32 is formed into an arc shape, and the first plane portion 32b inclines to the vehicle body rear side from the base portion of the flow straightening portion 32 toward the top portion 32a. In addition, the first plane portion 32b forms a curved surface that smoothly continues to the upper surface portion 31f of the holder main body 31. Furthermore, a second plane portion 32c is provided on the other side (vehicle body rear side) of the flow straightening portion 32 in the widthwise direction. The cross section of the second plane portion 32c along the widthwise direction of the flow straightening portion 32 is formed into an arc shape.

Accordingly, the traveling wind is guided smoothly along the holder main body 31 and the flow straightening portion 32, and a downforce generated when the traveling wind hits the flow straightening portion 32 can efficiently be applied to the wiper blade 42.

The radius of curvature of the first plane portion 32b is set to be larger than the radius of curvature of the second plane portion 32c. Hence, a traveling wind in an amount enough to prevent floating (lock back) of the wiper apparatus 4 can be made to hit the first plane portion 32b and straightened. Note that the sectional shape of the flow straightening portion 32 need not always be a curved surface but may be a planar shape as long as a desired flow straightening effect can be obtained.

The flow straightening portion 32 is formed into a long shape by an elastic material such as rubber and provided integrally with the holder main body 31 along the longitudinal direction. The hardness of the flow straightening portion 32 is set to be lower than the hardness of the holder main body 31 and the flow straightening portion 32 can elastically be deformed by the pressure of the traveling wind.

Note that the second arm portion 41b may also be provided with a flow straightening portion 43 configured to prevent lock back caused by floating of the second arm portion 41b, as shown in FIG. 2B. In addition, as shown in FIG. 2C, a flow straightening portion 45 may be formed on the upper surface portion of a wiper arm 44 to which a blade rubber is directly attached.

Figure 4A:
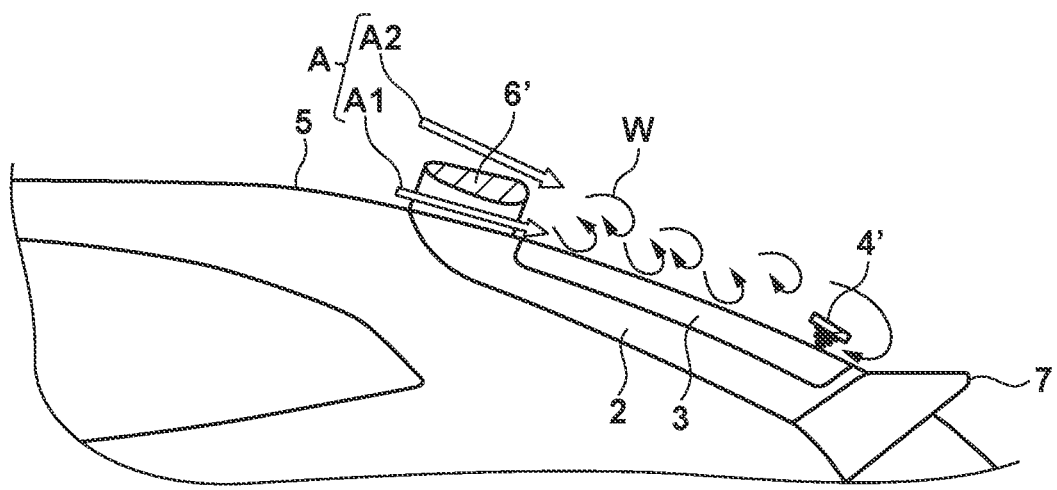
FIG. 4A is a view showing the flow straightening effect of the rear wiper apparatus according to the embodiment and the positional relationship between a roof, a rear windshield, and a rear spoiler.
Figure 4B:
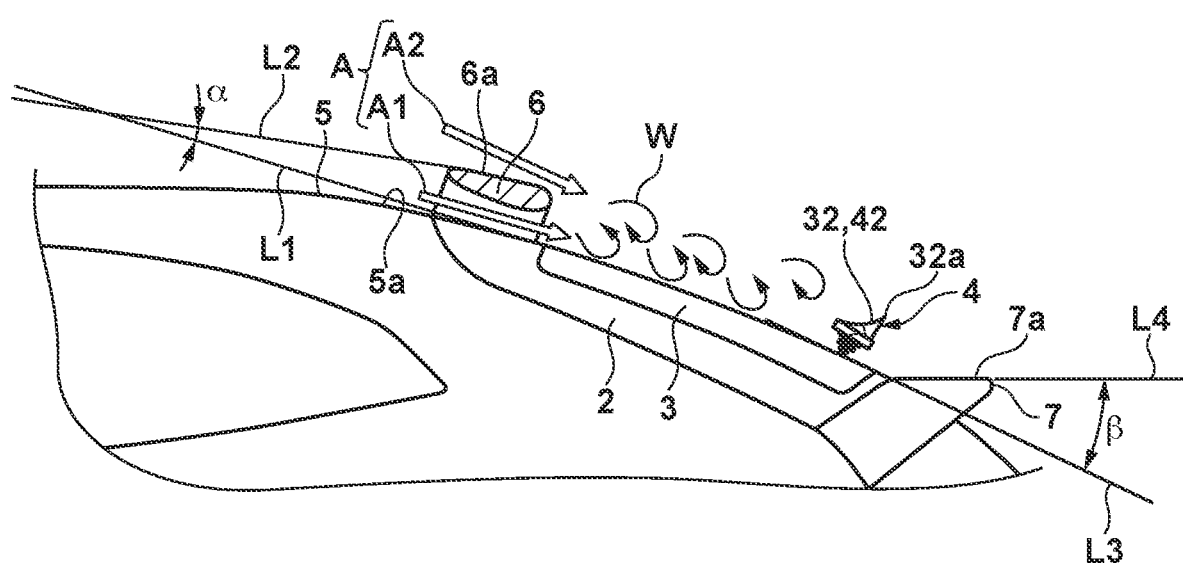
FIG. 4B is a view showing the flow straightening effect of the rear wiper apparatus according to the embodiment and the positional relationship between the roof, the rear windshield, and the rear spoiler.

As shown in FIGS. 1 and 4B, the second rear spoiler 7 is located on the vehicle body rear side with respect to the first rear spoiler 6, extends in the vehicle width direction at the rear end of the back door 2 or at a vehicle body rear portion in the vicinity thereof, and projects to the vehicle body rear side. The rear windshield 3 and the wiper apparatus 4 on the back door 2 are arranged between the first rear spoiler 6 and the second rear spoiler 7 arranged in the vehicle longitudinal direction. Note that the first rear spoiler 6 in not limited to the structure arranged at the rear end of the roof 5 and may be arranged at the upper end of the back door 2. In addition, the second rear spoiler 7 is not limited to the structure integrated with the back door 2 and may be a structure separated from the back door 2.

Note that as shown in FIG. 4B, when the vehicle body rear portion is viewed from the vehicle width direction, the larger an angle α made by a line segment L1 in contact with a roof surface 5a immediately before the spoiler and a line segment L2 in contact with an upper surface portion 6a of the spoiler is, the more largely the flow of a traveling wind A flowing from the roof surface 5a immediately before the spoiler is changed by the upper surface portion 6a of the spoiler. Hence, the first rear spoiler 6 receives a larger downforce. Similarly, the larger an angle β made by a line segment L3 in contact with a glass surface 3a immediately before the spoiler and a line segment L4 in contact with an upper surface portion 7a of the spoiler is, the larger the downforce received by the second rear spoiler 7 from the traveling wind A flowing from the glass surface 3a immediately before the spoiler becomes. In this embodiment, since the angle made by the glass surface 3a immediately before the spoiler and the upper surface portion 7a of the second rear spoiler 7 is larger than the angle α made by the roof surface 5a immediately before the spoiler and the upper surface portion 6a of the first rear spoiler 6 (α<β), the second spoiler 7 receives a downforce larger than that received by the first spoiler 6, and has a structure that attaches more importance to aerodynamic performance.

In addition, the wiper apparatus 4 is arranged to be adjacent to the second rear spoiler 7 in the vehicle longitudinal direction. In other words, the wiper apparatus 4 and the second rear spoiler 7 hold a positional relationship without the intervention of another member that impedes the flow of air. Note that, for example, a dam lip seal of the rear windshield 3, an attachment member of the second rear spoiler 7, an emblem, and the like may intervene if they are members that do not impede the flow of air. As described above, the wiper apparatus 4 is arranged at a position closer to the second rear spoiler 7 than the first rear spoiler 6. The top portion 32a of the flow straightening portion 32 of the wiper apparatus 4 is arranged at a position higher than the upper surface portion 7a of the second rear spoiler 7.

Figure 5A:
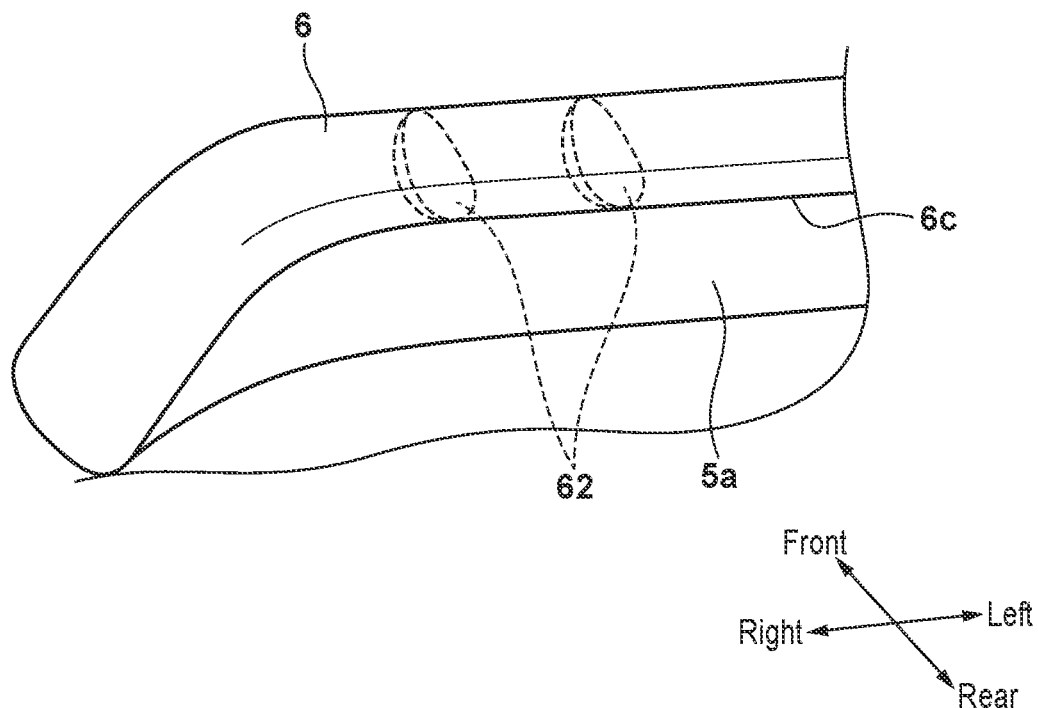
FIG. 5A is a view showing a projecting portion provided on the rear spoiler according to the embodiment.
Figure 5B:
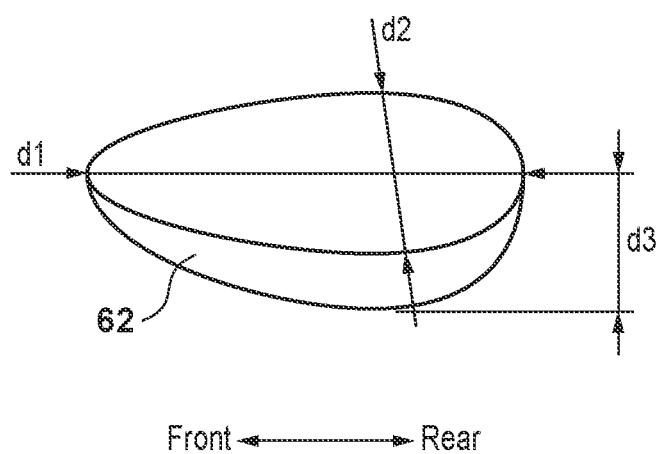
FIG. 5B is a view showing the projecting portion provided on the rear spoiler according to the embodiment.

As shown in FIG. 5A, a lower surface portion 6c of the first rear spoiler 6 (a portion facing the upper surface portion of the roof 5 or the upper surface portion of the back door 2) is provided with a projecting portion 62 that projects to the side of the roof surface 5a (downward) in the predetermined space G. One projecting portion 62 or a plurality of (preferably, two) projecting portions 62 are arranged at a predetermined interval in the vehicle width direction. The positions to provide the projecting portions 62 are positions at which the plurality of projecting portions 62 overlap the wiper apparatus 4 in the vehicle width direction when the first rear spoiler 6 is viewed from the vehicle longitudinal direction. As shown in FIG. 5B, the projecting portion 62 has a shape with a streamlined smooth curved surface extending in the vehicle longitudinal direction. For example, a length d1 in the vehicle longitudinal direction is 60 mm, a width d2 in the vehicle width direction is 30 mm, and a maximum height d3 is about 15 mm.

Explanation of Effect

According to the wiper apparatus 4 having the above-described configuration, as shown in FIG. 4B, vortices W generated by the first rear spoiler 6 can be straightened by the flow straightening portion 32 of the wiper apparatus 4, and a downforce can be applied to the wiper apparatus 4. It is therefore possible to prevent the wiper arm 41 of the wiper apparatus 4 from floating from the rear windshield 3.

In addition, if the vortices W generated by the first rear spoiler 6 directly hit the second rear spoiler 7, it may be impossible to obtain aerodynamic performance required of the second rear spoiler 7. However, since the wiper apparatus 4 is arranged between the first rear spoiler 6 and the second rear spoiler 7, the traveling wind straightened by the flow straightening portion 32 of the wiper apparatus 4 can be made to hit the second rear spoiler 7, and the aerodynamic performance required of the second rear spoiler 7 can be obtained.

Additionally, since the wiper apparatus 4 and the second rear spoiler 7 are arranged to be adjacent, a region with a low atmospheric pressure can be generated between the wiper apparatus 4 and the second rear spoiler 7. When the air straightened by the flow straightening portion 32 of the wiper apparatus 4 is brought into the low pressure region, the traveling wind can be positively made to hit the upper surface portion 7a of the second rear spoiler 7, and desired aerodynamic performance can be obtained.

Figure 6A:
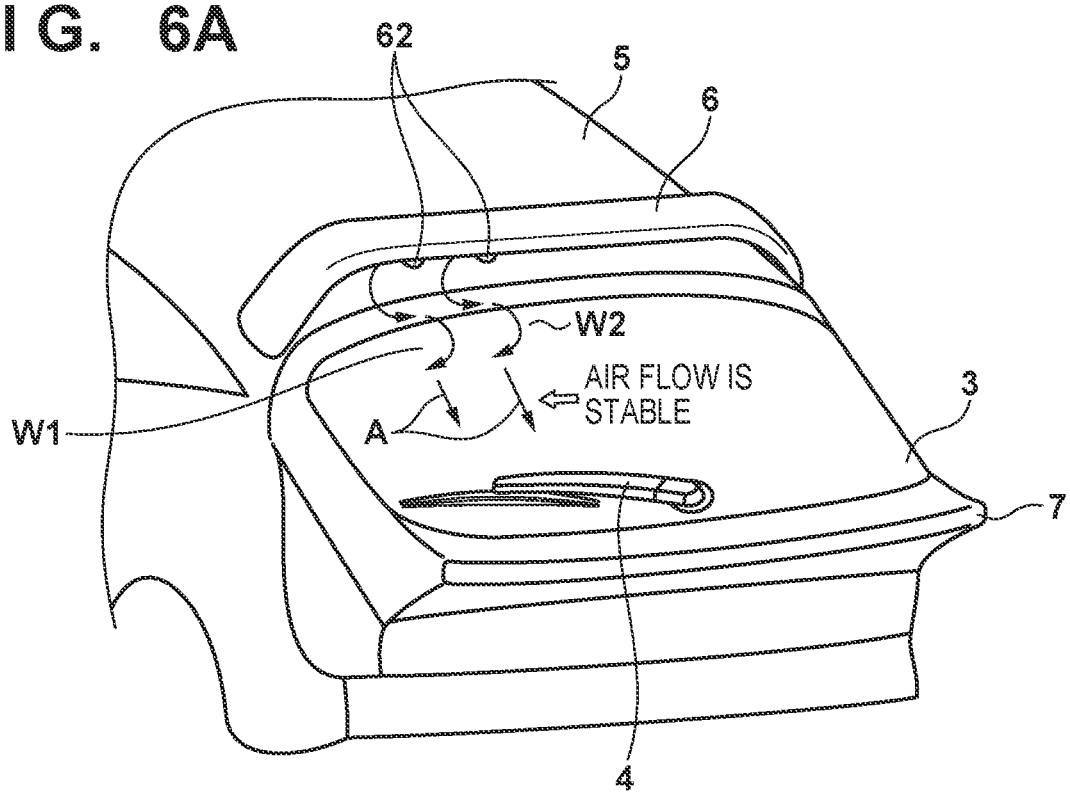
FIG. 6A is a view for explaining the flow straightening effect of the projecting portion of the rear spoiler according to the embodiment.
Figure 6B:
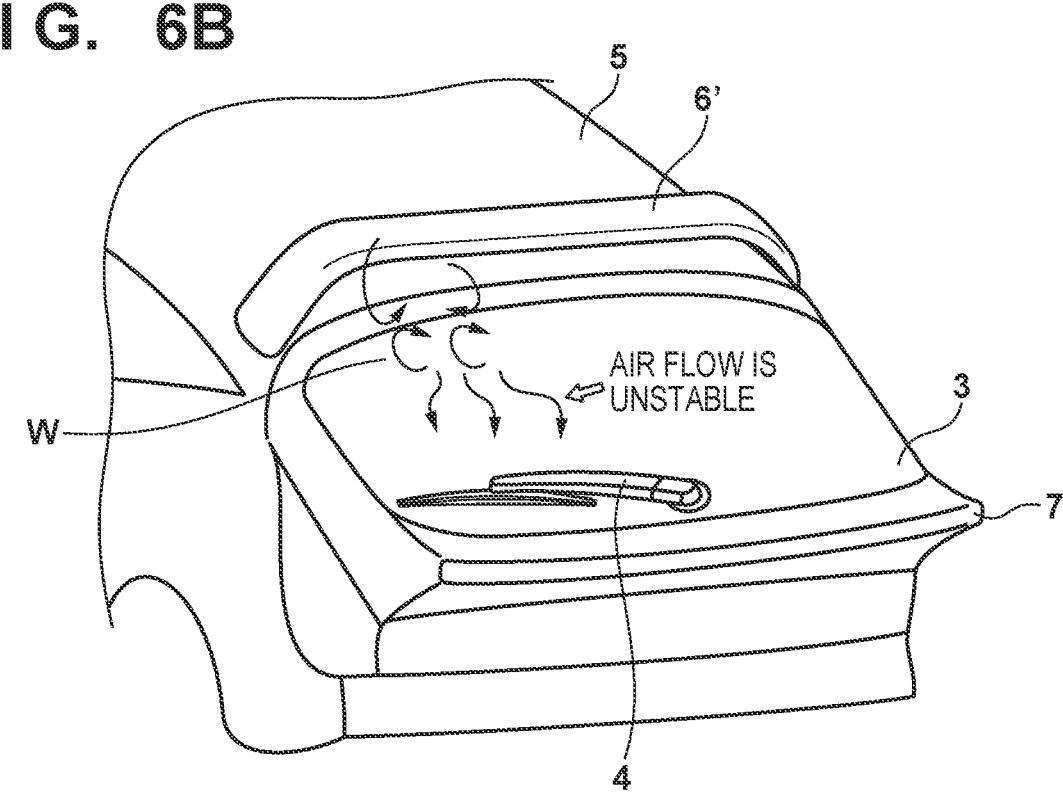
FIG. 6B is a view for explaining the flow straightening effect of the projecting portion of the rear spoiler according to the embodiment.

Furthermore, one or a plurality of projecting portions 62 are provided on the lower surface portion 6c of the first rear spoiler 6, and the projecting portions 62 are arranged at positions at which the projecting portions 62 overlap the wiper apparatus 4 in the vehicle width direction when the first rear spoiler 6 is viewed from the vehicle longitudinal direction. Accordingly, as compared to a case in which the projecting portions 62 are not provided, as shown in FIG. 6B, the vortices W generated by the first rear spoiler 6 are divided by the projecting portions 62 into vortices W1 and W2 in the vehicle width direction, as shown in FIG. 6A. Hence, the divided vortices W1 and W2 can be attenuated by making them interfere with each other, and the traveling wind A that hits the wiper apparatus 4 can be stabilized.

In addition, when the large vortices W hit the whole wiper apparatus 4, the wiper arm 41 readily floats into the lock back state. However, when the vortices W hitting the wiper apparatus 4 are divided, the position and direction of the force applied by each of the vortices W1 and W2 to the wiper apparatus 4 can be changed, and floating of the wiper apparatus 4 can be suppressed. Note that the projecting portion 62 is not an indispensable component for this embodiment, and whether to provide the projecting portion 62 is decided in accordance with the characteristic of the traveling wind flowing from the rear spoiler to the rear side.

As described above, according to this embodiment, it is possible to implement the wiper apparatus 4 and the vehicle body rear structure 1, which prevent the wiper apparatus 4 from floating and causing lock back due to the vortices W generated on the rear side of the first rear spoiler 6.

Note that the above-described embodiment is an example of implementing the present invention, and the present invention is applicable to the embodiment modified or changed without departing from the scope of the present invention. In this embodiment, the wiper apparatus of a vehicle has been described. However, the present invention is not limited to this, and can be applied to various application purposes other than the vehicle.

Summary of Embodiment

Configuration 1

There is provided a wiper apparatus 4 configured to wipe a rear windshield 3 of a vehicle body rear portion 1,
wherein above the vehicle body rear portion 1, the wiper apparatus is arranged on a rear side and a lower side of an ornamental member 6 arranged to form a space G to flow air between the ornamental member and an upper surface portion of the vehicle body rear portion, and
the wiper apparatus 4 is provided with a flow straightening portion 32 standing on the wiper apparatus 4 and including a surface portion 32b that inclines to a vehicle body rear side from a base portion toward a top portion.

According to configuration 1, since vortices W generated by the ornamental member 6 of the vehicle body rear portion 1 can be straightened by the flow straightening portion 32, the wiper apparatus 4 can be prevented from floating.

Configuration 2

In configuration 1, the surface portion comprises one of a curved surface projecting to the vehicle body rear side and a plane having a wedge-shaped cross section viewed from a vehicle width direction.

According to configuration 2, the surface portion can be formed to obtain a desired flow straightening effect.

Configuration 3

In configuration 1 or 2, a rear spoiler 7 is provided on the rear side of the ornamental member 6 in the vehicle body rear portion 1, and the wiper apparatus 4 is arranged between the ornamental member 6 and the rear spoiler 7 in a vehicle longitudinal direction.

According to configuration 3, when the vortices W generated by the ornamental member 6 directly hit the rear spoiler 7, it may be impossible to obtain aerodynamic performance required of the rear spoiler 7. However, when the wiper apparatus 4 is arranged between them, the wind straightened by the wiper apparatus 4 can be made to hit the rear spoiler 7, and the aerodynamic performance required of the rear spoiler 7 can be obtained.

Configuration 4

In configuration 3, the wiper apparatus 4 is arranged to be adjacent to the rear spoiler 7, and the top portion 32a of the flow straightening portion 32 is arranged at a position higher than an upper surface portion 7a of the rear spoiler 7.

According to configuration 4, a region with a low atmospheric pressure can be generated between the wiper apparatus 4 and the rear spoiler 7. When the air straightened by the flow straightening portion 32 of the wiper apparatus 4 is brought into the region, the traveling wind can be positively made to hit the upper surface portion 7a of the rear spoiler 7.

Configuration 5

In one of configurations 1 to 4, a projecting portion 62 projecting to the upper surface portion 5a is provided on a portion 6c of the ornamental member 6 facing the upper surface portion 5a of the vehicle body rear portion 1, and the projecting portion 62 is arranged at a position at which the projecting portion overlaps the wiper apparatus 4 in the vehicle width direction when viewed from the vehicle longitudinal direction.

Configuration 6

In configuration 5, the projecting portion 62 comprises a plurality of projecting portions arranged at an interval in the vehicle width direction.

According to configuration 5 or 6, since the vortices W generated by the ornamental member 6 can be divided by the projecting portions 62 in the vehicle width direction, it is possible to attenuate the divided vortices W1 and W2 by making them interfere with each other and prevent generation of large vortices.

In addition, when predetermined large vortices hit the whole wiper apparatus 4, the wiper apparatus 4 readily floats. However, when the vortices W hitting the wiper apparatus 4 are divided, the direction of the force applied by each of the vortices W1 and W2 to the wiper apparatus 4 can be changed, and floating of the wiper apparatus 4 can be suppressed.

Configuration 7

There is provided a vehicle body rear structure 1 including a wiper apparatus 4 configured to wipe a rear windshield 3, wherein above a vehicle body rear portion 1, an ornamental member 6 is provided to form a space G to flow air between the ornamental member 6 and an upper surface portion 5a of the vehicle body rear portion 1, and a projecting portion 62 projecting to the upper surface portion 5a is provided on a face 6c of the ornamental member 6 facing the upper surface portion 5a of the vehicle body rear portion 1, the projecting portion 62 being arranged at a position at which the projecting portion 62 overlaps the wiper apparatus 4 in a vehicle width direction when viewed from a vehicle longitudinal direction.

According to configuration 7, since the vortices W generated by the ornamental member 6 can be divided by the projecting portions 62 in the vehicle width direction, it is possible to attenuate the divided vortices W1 and W2 by making them interfere with each other and prevent generation of large vortices.

In addition, when predetermined large vortices hit the whole wiper apparatus 4, the wiper apparatus 4 readily floats. However, when the vortices W hitting the wiper apparatus 4 are divided, the direction of the force applied by each of the vortices W1 and W2 to the wiper apparatus 4 can be changed, and floating of the wiper apparatus 4 can be suppressed.

Configuration 8

In configuration 7, a rear spoiler 7 is provided on a rear side of the ornamental member 6 in the vehicle body rear portion 1, and the wiper apparatus 4 is arranged between the ornamental member 6 and the rear spoiler 7 in the vehicle longitudinal direction.

According to configuration 8, when the vortices W generated by the ornamental member 6 directly hit the rear spoiler 7, it may be impossible to obtain aerodynamic performance required of the rear spoiler 7. However, when the wiper apparatus 4 is arranged between them, the wind straightened by the wiper apparatus 4 can be made to hit the rear spoiler 7, and the aerodynamic performance required of the rear spoiler 7 can be obtained.

The present invention is not limited to the above embodiments, and various changes and modifications can be made within the spirit and scope of the present invention. Therefore, to apprise the public of the scope of the present invention, the following claims are made.

What is claimed is:

1. A wiper apparatus configured to wipe a rear windshield of a vehicle body rear portion, wherein
above the vehicle body rear portion, the wiper apparatus is arranged on a rear side and a lower side of an ornamental member arranged to form a space to flow air between the ornamental member and a roof surface in the vehicle body rear portion,
a plurality of projecting portions projecting to the roof surface are provided on a lower surface of the ornamental member facing the roof surface and are arranged at an interval in a vehicle width direction, and
a rear spoiler is provided on the rear side of the ornamental member in the vehicle body rear portion,
the projecting portions are arranged at a position at which the projecting portions overlap the wiper apparatus in the vehicle width direction when viewed from the vehicle longitudinal direction,
the wiper apparatus is provided with a flow straightening portion standing on the wiper apparatus and including a surface portion that inclines to a vehicle body rear side from a base portion toward a top portion, and
the wiper apparatus is arranged between and spaced from the ornamental member and the rear spoiler in a vehicle longitudinal direction,
a space through which a traveling wind passes is formed between the roof surface and the lower surface of the ornamental member,
the ornamental member is arranged on a front side of a front end of the rear windshield, the rear spoiler is arranged on a rear side of a rear end of the rear windshield, and the wiper apparatus is arranged on the rear windshield.

2. The wiper apparatus according to claim 1, wherein the surface portion comprises one of a curved surface projecting to the vehicle body rear side and a plane having a wedge-shaped cross section viewed from a vehicle width direction.

3. The wiper apparatus according to claim 1, wherein
the wiper apparatus is arranged to be adjacent to the rear spoiler, and
the top portion of the flow straightening portion is arranged at a position higher than the upper surface portion of the rear spoiler.

4. The wiper apparatus according to claim 1, wherein the projecting portions each have a shape with a streamlined smooth curved surface extending in the vehicle longitudinal direction.

* * * * *